(12) United States Patent
Nakamura et al.

(10) Patent No.: US 10,682,793 B2
(45) Date of Patent: Jun. 16, 2020

(54) METHOD FOR MANUFACTURING RESIN GEAR WITH CORE METAL

(71) Applicant: NAKANISHI METAL WORKS CO., LTD., Osaka-shi (JP)

(72) Inventors: Masayoshi Nakamura, Osaka (JP); Yuto Ayukawa, Osaka (JP)

(73) Assignee: NAKANISHI METAL WORKS CO., LTD., Osaka-shi (JP)

(*) Notice: Subject to any disclaimer, the term of this patent is extended or adjusted under 35 U.S.C. 154(b) by 403 days.

(21) Appl. No.: 15/189,456

(22) Filed: Jun. 22, 2016

(65) Prior Publication Data

US 2017/0001351 A1    Jan. 5, 2017

(30) Foreign Application Priority Data

Jul. 3, 2015    (JP) .................................. 2015-134081

(51) Int. Cl.
*B29C 45/16* (2006.01)
*B29C 45/14* (2006.01)
(Continued)

(52) U.S. Cl.
CPC ...... *B29C 45/1671* (2013.01); *B29C 45/1459* (2013.01); *B29C 45/14065* (2013.01);
(Continued)

(58) Field of Classification Search
CPC .................. B29C 33/12; B29C 33/123; B29C 2045/1692; B29C 2045/14122;
(Continued)

(56) References Cited

U.S. PATENT DOCUMENTS

| 4,946,427 A * | 8/1990 | Rampe ................... F16H 7/023 29/892 |
| 6,941,832 B2 * | 9/2005 | Noguchi ............. B29C 45/0046 264/478 |

(Continued)

FOREIGN PATENT DOCUMENTS

| EP | 0303113 A1 * | 2/1989 | ............. F16H 55/06 |
| EP | 0619445 A1 * | 10/1994 | ......... B29C 45/1671 |

(Continued)

OTHER PUBLICATIONS

Gear Forces; Kohara Gear Industry Co., Ltd.; Gear Technical References; KHK Gears; Section 12; Japan; 2015 https://khkgears.net/new/gear_knowledge/gear_technical_reference/ https://khkgears.net/new/gear_knowledge/gear_technical_reference/gear_forces.html (3 cover pages, 12 pages, 15 pages total).

(Continued)

*Primary Examiner* — Atul P. Khare

(74) *Attorney, Agent, or Firm* — Kratz, Quintos & Hanson, LLP

(57) ABSTRACT

The present invention is intended to provide a method for manufacturing a resin gear with a core metal by which there is no reduction in strength even with gates allowing decrease in material costs such as pin gates in the molding die for injection molding.

The manufacturing method includes: gates at a primary molding step and gates at a secondary molding step are pin gates or the like. The number of the gates at the primary molding step and the number of the gates at the secondary molding step are plural and identical, and the gates are arranged circumferentially. Gate positions G21, . . . at the secondary molding step are circumferentially intermediate or nearly circumferentially intermediate between gate posi- (Continued)

tions G11, . . . and weld positions W11, . . . adjacent to the gate positions G11, . . . in the primary molded article.

9 Claims, 7 Drawing Sheets

(51) Int. Cl.
  *B29L 15/00* (2006.01)
  *B29K 705/00* (2006.01)
  *B29K 105/06* (2006.01)
  *B29C 45/00* (2006.01)
  *B29C 33/12* (2006.01)

(52) U.S. Cl.
  CPC ...... *B29C 45/1615* (2013.01); *B29C 45/1675* (2013.01); *B29C 33/123* (2013.01); *B29C 2045/0027* (2013.01); *B29C 2045/0032* (2013.01); *B29C 2045/14122* (2013.01); *B29C 2045/14147* (2013.01); *B29C 2045/14442* (2013.01); *B29C 2045/1692* (2013.01); *B29K 2105/06* (2013.01); *B29K 2705/00* (2013.01); *B29L 2015/003* (2013.01); *B29L 2015/006* (2013.01)

(58) Field of Classification Search
  CPC ........... B29C 2045/14147; B29C 2045/14442; B29C 2045/1682; B29C 45/1671; B29C 45/1615; B29C 45/14065; B29C 45/1459; B29C 45/14344; B29C 70/74
  See application file for complete search history.

(56) References Cited

U.S. PATENT DOCUMENTS

| | | | | |
|---|---|---|---|---|
| 6,993,993 | B2* | 2/2006 | Konishi | F16H 55/06 74/446 |
| 7,296,491 | B2* | 11/2007 | Noguchi | B29C 45/0025 74/411 |
| 7,406,891 | B2* | 8/2008 | Miyasaka | B29C 45/0025 425/542 |
| 7,785,013 | B2* | 8/2010 | Egami | F16C 33/201 384/283 |
| 9,205,611 | B2* | 12/2015 | Oolderink | B29C 37/0082 |
| 10,414,078 | B2 | 9/2019 | Brochot | |
| 2005/0205714 | A1* | 9/2005 | Horita | B29C 45/0025 242/611 |
| 2007/0186710 | A1* | 8/2007 | Miyauchi | F16H 55/06 74/431 |
| 2008/0219607 | A1 | 9/2008 | Murao | |

FOREIGN PATENT DOCUMENTS

| | | | | |
|---|---|---|---|---|
| EP | 2060380 A1 * | 5/2009 | ........ | B29C 45/0025 |
| JP | 55063054 A * | 5/1980 | ............ | F16H 55/12 |
| JP | 58128563 A * | 8/1983 | ............ | F16H 55/06 |
| JP | 2002-333059 A1 | 11/2002 | | |
| JP | 2004-052791 A | 2/2004 | | |
| JP | 2004052791 A * | 2/2004 | | |
| JP | 2004-255621 A | 9/2004 | | |
| JP | 2004255621 A * | 9/2004 | ........ | B29C 45/0025 |
| JP | 2005022368 A * | 1/2005 | | |
| JP | 2008149502 A * | 7/2008 | | |
| JP | 2008-213393 A | 9/2008 | | |
| JP | 2009257501 A * | 11/2009 | | |
| JP | 2012-46168 A1 | 3/2012 | | |
| JP | 2013-152007 A | 8/2013 | | |
| JP | 2014237231 A * | 12/2014 | | |

OTHER PUBLICATIONS

Y. Susumu; "Study on Welding Mechanism of Injection Welding Process"; Seikei-Kakou; vol. 11; No. 5; 1999; pp. 440-450 (11 pages).

Office Action of Japanese Patent Application No. 2015-134081: Notification of Reasons for Refusal dated Mar. 27, 2019 (3 pages, 4 pages translation, 7 pages total).

* cited by examiner

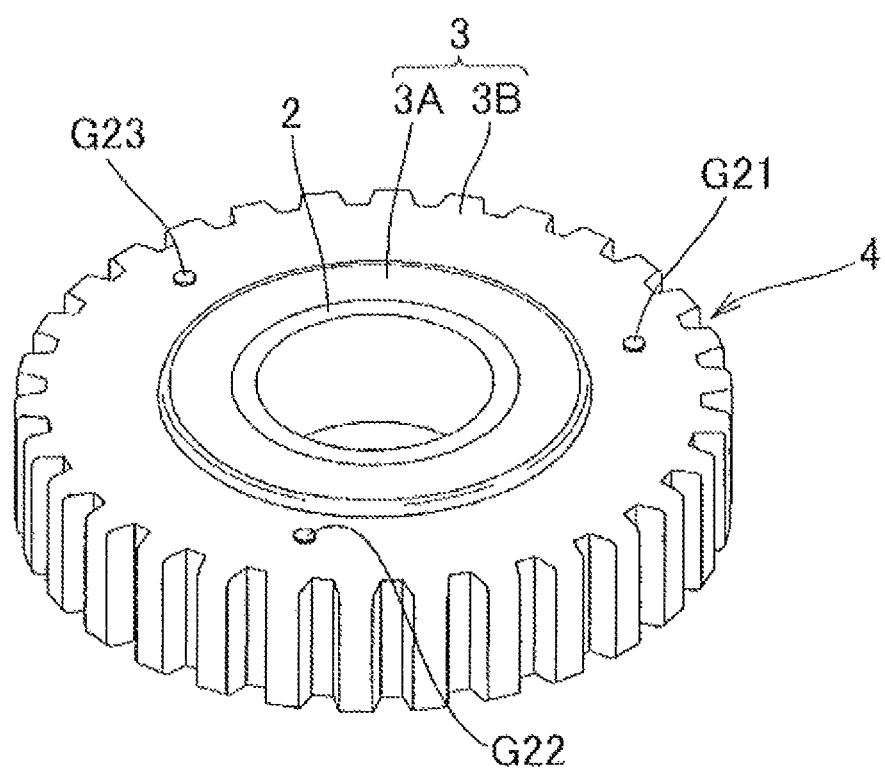

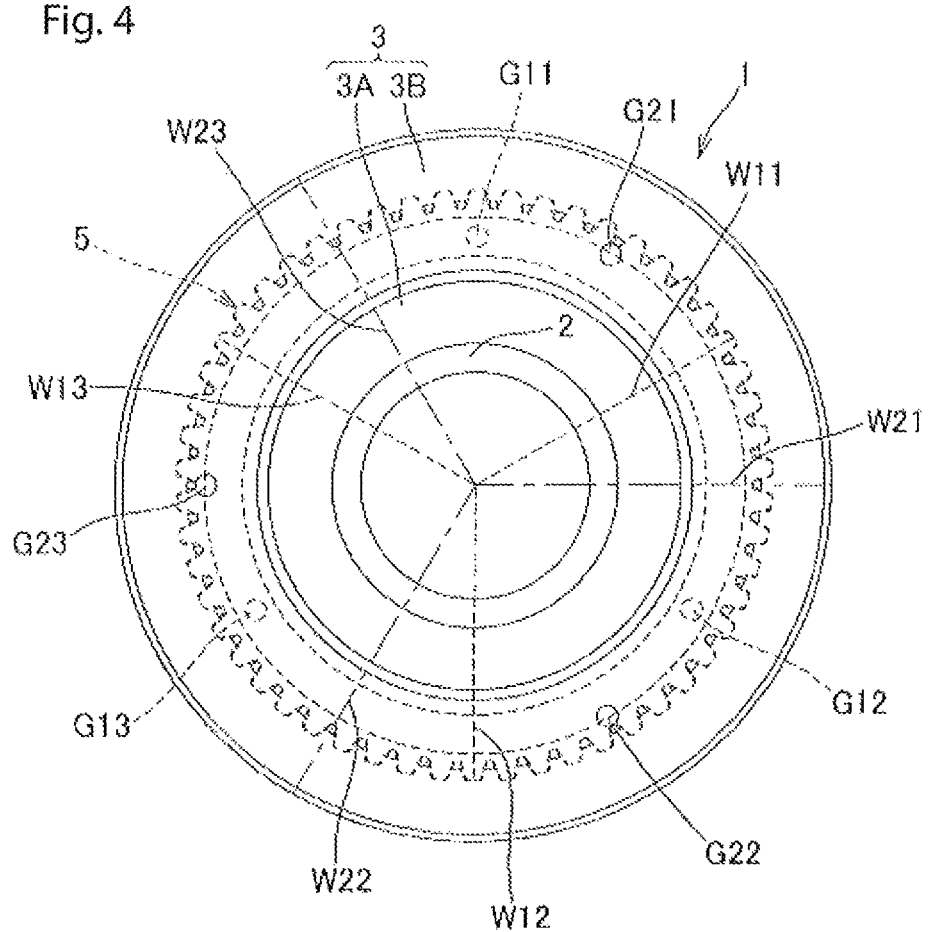

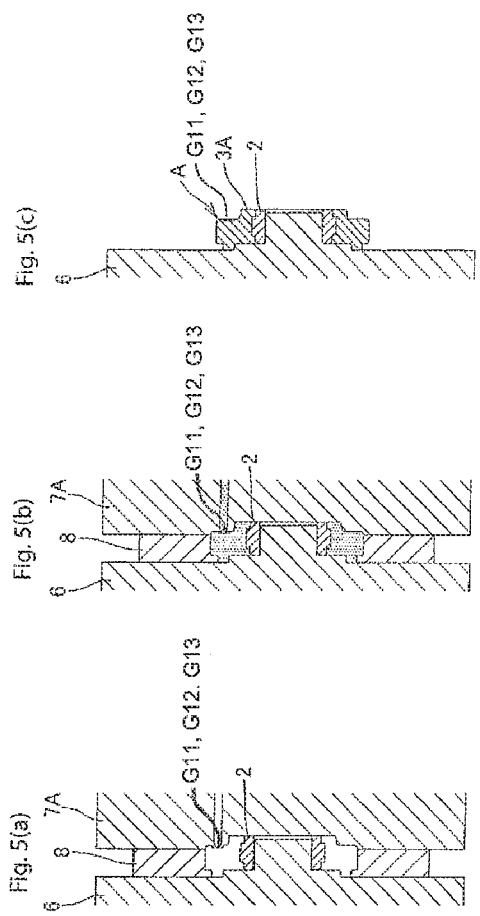

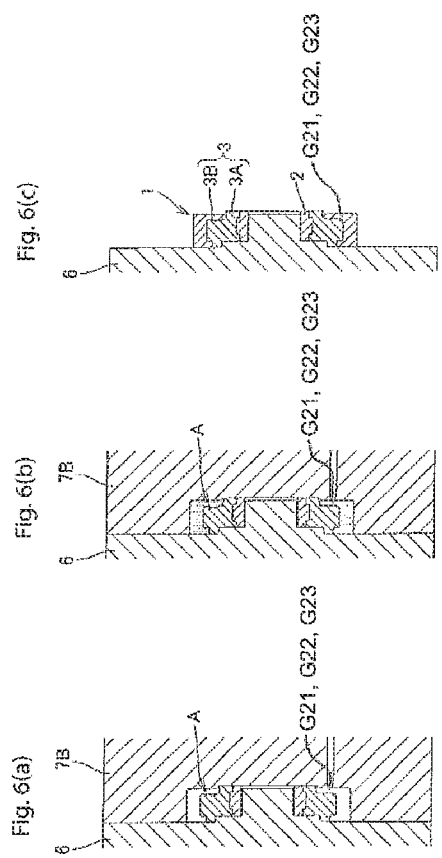

METHOD FOR MANUFACTURING RESIN GEAR WITH CORE METAL

TECHNICAL FIELD

The present invention relates to a method for manufacturing a resin gear for power transmission composed of a metallic sleeve as a core metal and a synthetic resin tooth part covering the outer periphery of the metallic sleeve.

BACKGROUND ART

There is a resin gear with a core metal in which a metallic gear has a synthetic resin part of teeth to engage with another gear, that is, a resin gear with a core metal composed of a metallic sleeve as a core metal and a synthetic resin tooth part covering the outer periphery of the metallic sleeve to reduce the weight of the power transmission gear and suppress noise from the same.

In such a resin gear with a core metal, for reduction of manufacturing costs and improvement of quietness, the tooth part is formed from an outer member with teeth to engage with another gear (gear main body or second molded part) and an inner member that is interposed between the outer periphery of the sleeve and the outer member and is lower in hardness than the outer member (annular member or first molded part) (for example, refer to Patent Documents 1 and 2).

The conventional resin gear with a core metal is manufactured by forming the inner member by injection molding (primary molding) with the metallic sleeve as an insert and then forming the outer member by injection molding (secondary molding) in another cavity molding die, as described in Patent Document 1, FIG. 4, and Patent Document 2, FIGS. 3 and 4.

CITATION LIST

Patent Literatures

Patent Document 1: JP-A No. 2002-333059
Patent Document 2: JP-A No. 2012-046168

SUMMARY OF INVENTION

Technical Problem

When the gate of the injection molding die for forming the inner member by primary molding with the metallic sleeve as an insert and the gate of the injection molding die for forming the outer member by secondary molding on the primary molded article are film gates as described in Patent Document 2 (see FIG. 3, 90a, and the specification, paragraph [0023]), disc gates, or ring gates, wasted material increases to raise material costs. In addition, it is necessary to perform a turning process for cutting the gates, which leads to a rise in manufacturing costs.

Meanwhile, when the gates are pin gates, wasted material decreases to reduce material costs. In addition, the gates are cut automatically when the molding die is opened to negate the need for cutting the gates after the removal of the molded article. This allows reduction in manufacturing costs.

However, when the gates are pin gates, in the inner member formed by the primary molding and the outer member formed by the secondary molding, the gate positions and weld positions in the molded article as singularities of concerns about lower strength may overlap radially or the weld positions may overlap radially, or they may exist near the radially overlapping positions.

In this case, the resin gear with a core metal as a molded article becomes lower in strength.

In light of the foregoing circumstances, to solve the problems, an object of the present invention is to provide a method for manufacturing a resin gear with a core metal by which there is no reduction in strength even with gates allowing decrease in material costs such as pin gates in the molding die for injection molding.

Solution to Problem

To solve the foregoing problems, a method for manufacturing a resin gear with a core metal according to the present invention is a method for manufacturing a resin gear with a core metal composed of a metallic sleeve as the core metal and a synthetic resin annular tooth part covering the outer periphery of the metallic sleeve, comprising: a primary molding step of setting the tooth part as an annular inner member and an annular outer member of different materials and forming the inner member by injection molding in a first cavity molding die with the sleeve as an insert; and a secondary molding step of putting a primary molded article formed at the primary molding step into a second cavity molding die and forming the outer member by injection molding, wherein gates for injecting a molten resin into the first cavity molding die at the primary molding step and gates for injecting a molten resin into the secondary cavity molding die at the secondary molding step are pin gates, tunnel gates, or side gates, the number of the gates at the primary molding step and the number of the gates at the secondary molding step are plural and identical and the gates are arranged circumferentially, and gate positions at the secondary molding step are circumferentially intermediate or nearly circumferentially intermediate between gate positions and weld positions adjacent to the gate positions in the primary molded article.

In addition, to solve the foregoing problems, a method for manufacturing a resin gear with a core metal according to the present invention is a method for manufacturing a resin gear with a core metal composed of a metallic sleeve as the core metal and a synthetic resin annular tooth part covering the outer periphery of the metallic sleeve, comprising: a primary molding step of setting the tooth part as an annular inner member and an annular outer member of different materials and forming the inner member by injection molding in a first cavity molding die with the sleeve as an insert; and a secondary molding step of putting a primary molded article formed at the primary molding step into a second cavity molding die and forming the outer member by injection molding, wherein a gate for injecting a molten resin into the first cavity molding die at the primary molding step and a gate for injecting a molten resin into the secondary cavity molding die at the secondary molding step are pin gates, tunnel gates, or side gates, the number of the gate at the primary molding step and the number of the gate at the secondary molding step are one each, and a gate position at the secondary molding step is circumferentially intermediate or nearly circumferentially intermediate between a gate position and a weld position in the primary molded article.

According to these manufacturing methods, the gates of the molding dies for use at the primary molding step and the secondary molding step are pin gates, tunnel gates, or side gates, which decreases wasted material to reduce material costs as compared to the case where the gates are film gates, disc gates, or the like.

In addition, when the gates are pin gates or tunnel gates, the gates are cut automatically when the molding dies are opened, which eliminates the need to cut the gates after the removal of the molded article, as compared to the case where the gates are film gates, disc gates, or the like.

Further, the gate position(s) at the secondary molding step is circumferentially intermediate or nearly circumferentially intermediate between the gate position(s) and weld position(s) adjacent to the gate position(s) in the primary molded article formed at the primary molding step or the gate position(s) at the secondary molding step is circumferentially intermediate or nearly circumferentially intermediate between the gate position(s) and the weld position(s) in the primary molded article. Accordingly, weld(s) in the secondary molded article is generated at position(s) circumferentially intermediate or nearly circumferentially intermediate between the gate(s) and the weld(s) in the primary molded article.

Therefore, in the resin gear with a core metal manufactured through the primary molding step and the secondary molding step, a radial weld line(s) formed at the primary molding step and a radial weld line(s) formed at the secondary molding step do not overlap or are not positioned close to each other.

Therefore, it is possible to suppress reduction in the strength of the resin gear with a core metal as a molded article.

It is preferred in particular that the annular inner member and the annular outer member are made of fiber-reinforced resins.

According to the manufacturing method, in the fiber-reinforced resin tooth part (the annular inner member and the annular outer member) in which the rate of decline in the strength of the weld line(s) would become larger with increase in charging amount of fiber-reinforced materials, the radial weld line(s) formed at the primary molding step and the radial weld line(s) formed at the secondary molding step do not overlap or are not positioned close to each other. This enhances the effect of suppressing reduction in the strength of the resin gear with a core metal as a molded article.

Advantageous Effects of Invention

According to the method for manufacturing a resin gear with a core metal of the present invention as described above, it is possible to decrease manufacturing costs and suppress reduction in the strength of the resin gear with a core metal manufactured through the primary molding step and the secondary molding step.

BRIEF DESCRIPTION OF DRAWINGS

FIG. 1 is a perspective view of a resin gear with a core metal manufactured by a method for manufacturing a resin gear with a core metal according to a first embodiment of the present invention (in which the number of gates is three);

FIG. 4 is a plane view of the resin gear with a core metal before formation of the teeth on the outer peripheral surface to engage with another gear, also illustrating gate positions and weld positions at the primary molding step and gate positions and weld positions at the secondary molding step;

FIGS. 5(a) to 5(c) are illustrative diagrams of primary molding by two-color molding, FIG. 5(a) illustrating the state in which the molding die is closed, FIG. 5(b) illustrating the state in which a molten resin for primary molding is injected, and FIG. 5(c) illustrating the state in which the primary molding is completed;

FIGS. 6(a) to 6(c) are illustrative diagrams of secondary molding by two-color molding, FIG. 6(a) illustrating the state in which the molding die is closed, FIG. 6(b) illustrating the state in which a molten resin for secondary molding is injected, and FIG. 6(c) illustrating the state in which the secondary molding is completed.

DESCRIPTION OF EMBODIMENTS

Next, embodiments of the present invention will be described in detail with reference to the accompanying drawings. However, the present invention is not limited to the embodiments illustrated in the accompanying drawings but includes all of embodiments satisfying the requirements described in the claims.

First Embodiment

As illustrated in the perspective view of FIG. 1, a resin gear with a core metal 1 manufactured by a method for manufacturing a resin gear with a core metal according to a first embodiment of the present invention is used as a worm wheel of a worm gear for electric power steering, for example. The resin gear with a core metal 1 is composed of a metallic sleeve 2 as a core metal and a synthetic resin annular tooth part 3 covering the outer periphery of the metallic sleeve 2, and has teeth 4 on the outer peripheral surface to engage with another gear.

The annular tooth part 3 is composed of an annular inner member 3A and an annular outer member 3B made of different fiber-reinforced resins, for example.

The resin gear with a core metal 1 has on a side surface three gate marks (see gate positions G21, G22, and G23) at the secondary molding step.

In the resin gear with a core metal 1, the annular tooth part 3 is made of a synthetic resin to achieve significant weight reduction as compared to the entirely metallic gear.

The method for manufacturing a resin gear with a core metal according to the first embodiment of the present invention is as follows:

(Primary Molding Step)

Figure 2A:
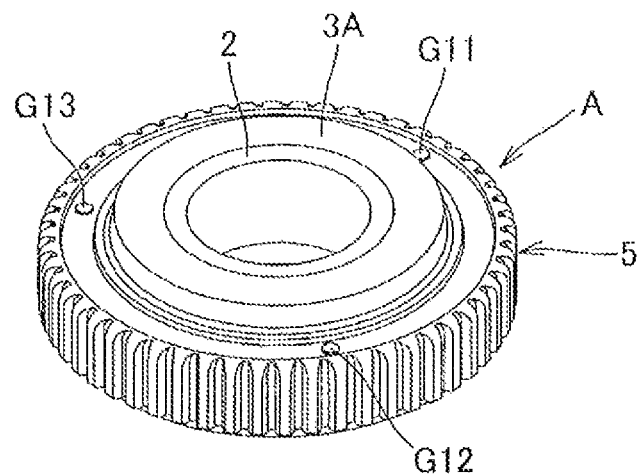
FIG. 2(a) is a perspective view of a primary molded article manufactured at a primary molding step in which a plurality of tooth-shaped projections is formed on an outer peripheral surface to restrain circumferential rotational displacement relative to a secondary molded article.
Figure 2B:
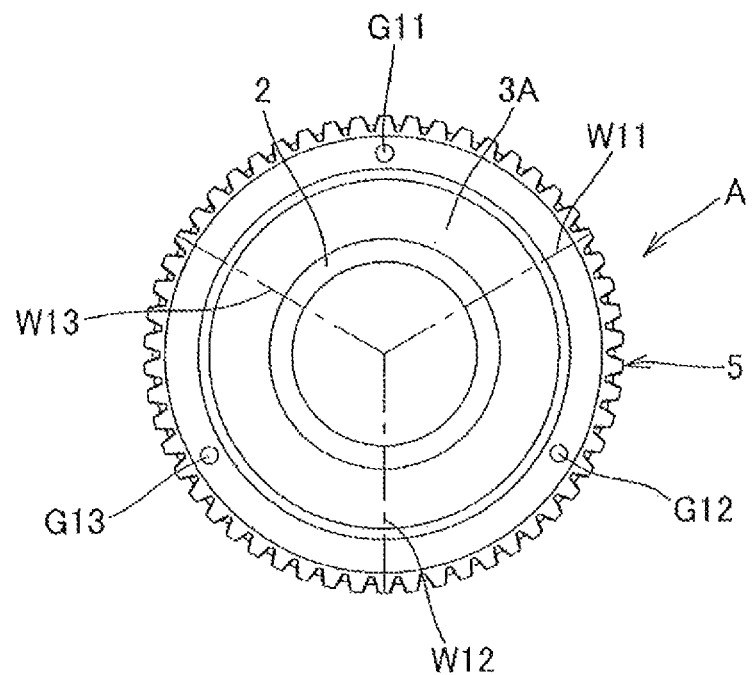
FIG. 2(b) is a plane view of the primary molded article.

First, a primary molding step is performed to form the inner member 3A by injection molding in a first cavity molding die not illustrated with the sleeve 2 as an insert, thereby manufacturing a primary molded article A illustrated in the perspective view of FIG. 2(a) and the plane view of FIG. 2(b). The primary molded article A (the annular inner member 3A) has tooth-shaped projections (convex-concave shape) 5 on the outer peripheral surface.

Gates for injecting a molten resin into the first cavity molding die at the primary molding step are pin gates, tunnel gates, or side gates. The number of the gates is three. The gates are arranged circumferentially at equal angles (circumferentially at equal intervals).

(Secondary Molding Step)

Figure 3A:
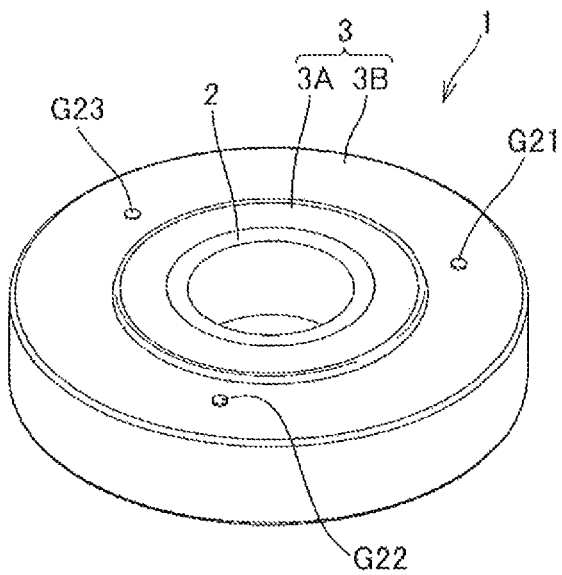
FIG. 3(a) is a perspective view of a resin gear with a core metal manufactured at the secondary molding step before formation of teeth on the outer peripheral surface to engage with another gear.
Figure 3B:
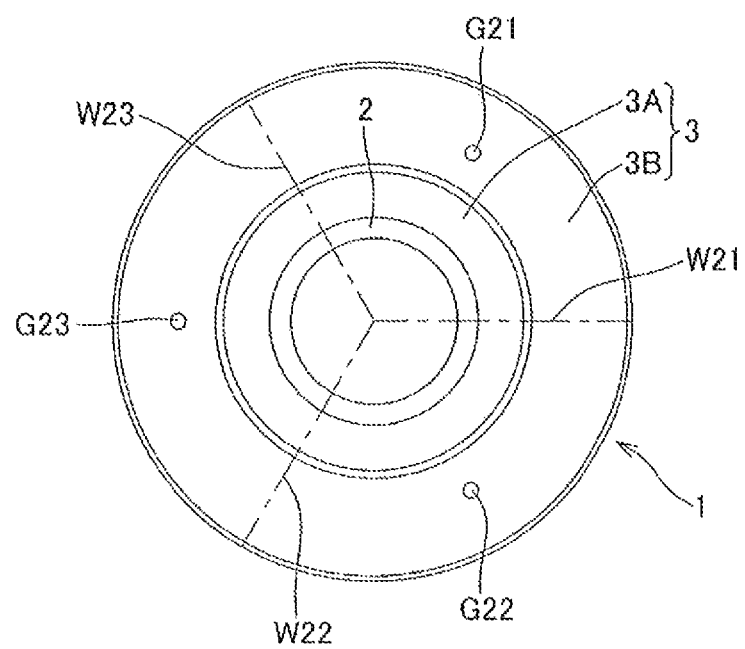
FIG. 3(b) is a plane view of the resin gear with a core metal.

Next, a secondary molding step is performed to put the primary molded article A illustrated in FIG. 2 into a second cavity molding die not illustrated and form the outer member 3B by injection molding, thereby manufacturing the resin gear with a core metal 1 (before formation of the teeth 4 on the outer peripheral surface to engage with another gear) illustrated in the perspective view of FIG. 3(a) and the plane view of FIG. 3(b). The primary molded article A (the annular inner member 3A) has the tooth-shaped projections 5 on the outer peripheral surface, and the molten resin injected at the secondary molding step is charged between the convexes and concaves of the tooth-shaped projections 5. This makes it possible to restrain relative circumferential rotational displacement between the annular inner member 3A formed by the primary molding and the annular outer member 3B formed by the secondary molding.

Gates for injecting the molten resin into the second cavity molding die at the secondary molding step are pin gates, tunnel gates, or side gates. The number of the gates is three that is the same as the number of the gates at the primary molding step. The gates are arranged circumferentially at equal angles (circumferentially at equal intervals).

It is here necessary to form the teeth 4 on the outer peripheral surface of the outer member 3B to engage with another gear as illustrated in FIG. 1. The teeth 4 are formed by mechanical work such as gear cutting after the completion of the secondary molding step, for example, but may be formed at the secondary molding step.

(Gate Arrangements and Weld Positions)

As illustrated in the plane views of FIGS. 2(b) and 4, at the primary molding step, the molten resin is injected from gate positions G11, G12, and G13 into the first cavity molding die. Accordingly, the circumferentially intermediate positions between the gates arranged circumferentially at equal angles constitute weld positions (weld lines) W11, W12, and W13.

As illustrated in the plane views of FIGS. 3(b) and 4, gate positions G21, G22, and G23 at the secondary molding step are circumferentially intermediate between the gate positions G11, G12, and G13 and the weld positions W11, W12, and W13 adjacent to the gate positions G11, G12, and G13 in the primary molded article A.

Alternatively, the gate positions G21, G22, and G23 at the secondary molding step may be nearly circumferentially intermediate between the gate positions G11, G12, and G13 and the weld positions W11, W12, and W13 adjacent to the gate positions G11, G12, and G13 in the primary molded article A.

By the gate arrangements at the secondary molding step (see the gate positions G21, G22, and G23), a weld position (weld line) W21 at the secondary molding step is circumferentially intermediate between the weld position W11 and the gate position G12.

Similarly, a weld position (weld line) W22 at the secondary molding step is circumferentially intermediate between the weld position W12 and the gate position G13, and a weld position (weld line) W23 at the secondary molding step is circumferentially intermediate between the weld position W13 and the gate position G11.

In the foregoing description, the gates for injecting the molten resin into the first cavity molding die at the primary molding step and the gates for injecting the molten resin into the second cavity molding die at the secondary molding step (pin gates, tunnel gates, or side gates) are arranged circumferentially at equal angles (circumferentially at equal intervals). However, the present invention is not limited to the configuration in which the gates are arranged circumferentially at equal angles and includes the configurations in which the gates are arranged circumferentially but not at equal angles.

Next, supplementary explanations will be given as to injection molding at the primary molding step and the secondary molding step.

In the method for manufacturing a resin gear with a core metal according to the present invention, the primary molding step of forming the primary molded article A by injection molding in the first cavity molding die and the secondary molding step of putting the primary molded article A into the second cavity molding die and performing injection molding may be performed by either of two methods, the molding method using individually two kinds of molding dies and the two-color molding method.

According to the molding method using individually two kinds of molding dies, after the completion of the primary molding step, the primary molded article A is removed from the primary molding die and is set in the secondary molding die for secondary molding.

According to the two-color molding step, a two-color injection molding machine including a common movable molding die, a fixed molding die for primary molding, and a fixed molding die for secondary molding is used to perform molding with automatic change of the fixed molding die between the primary molding and the secondary molding.

An example of the two-color molding method will be explained.

First, the primary molding will be described with reference to the illustrative diagram of FIG. 5.

The metallic sleeve 2 as an insert illustrated in FIG. 5(a) is set in a movable molding die 6, and the movable molding die 6 and a fixed molding die for primary molding 7A are closed. In this state, a molten resin for primary molding is injected into the cavity molding die (equivalent to the "first cavity molding die" of the present invention) as illustrated in FIG. 5(b).

Accordingly, the primary molded article A is formed as illustrated in FIG. 5(c). FIG. 5(c) illustrates the state in which, after the completion of the primary molding, the fixed molding die for primary molding 7A is separated from the movable molding die 6 and a slide core 8 is moved.

Next, the secondary molding will be described with reference to the illustrative diagram of FIG. 6.

After the completion of the primary molding, the movable molding die 6 holding the primary molded article A as illustrated in FIG. 5(c) moves (rotates or slides) automatically to the position where a secondary molding fixed molding die 7B is set.

When the movable molding die 6 and the fixed molding die for secondary molding 7B are closed as illustrated in FIG. 6(a), a molten resin for secondary molding is injected into the cavity molding die (equivalent to the "second cavity molding die" of the present invention) as illustrated in FIG. 6(b).

Accordingly, the resin gear with a core metal 1 (before formation of the teeth on the outer peripheral surface to engage with another gear) is formed as illustrated in FIG. 6(c). The resin gear with a core metal 1 is removed from the movable molding die 6.

Second Embodiment

Figure 7:
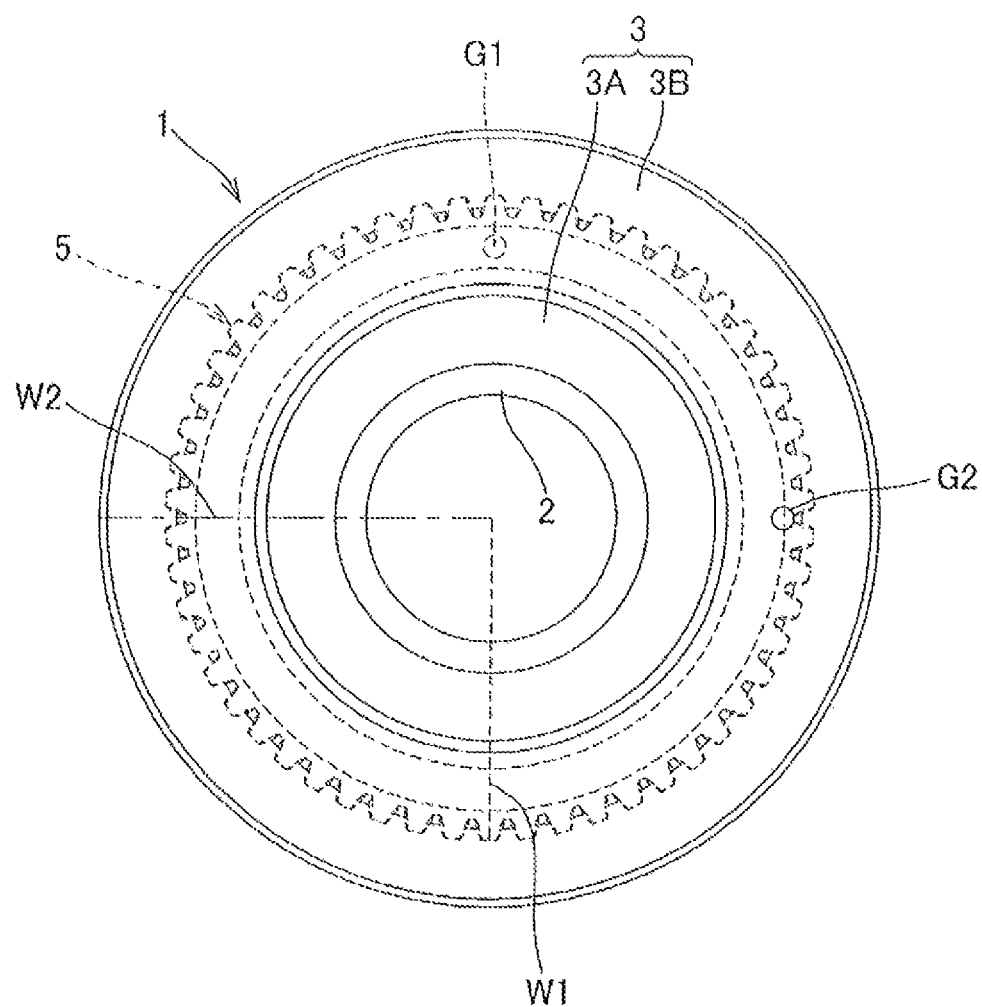
FIG. 7 is a plane view of a resin gear with a core metal manufactured by a method for manufacturing a resin gear with a core metal according to a second embodiment of the present invention (in which the number of a gate is one), also illustrating a gate position and a weld position at the primary molding step and a gate position and a weld position at the secondary molding step.

In a resin gear with a core metal 1 manufactured by a method for manufacturing a resin gear with a core metal according to a second embodiment of the present invention illustrated in the plane view of FIG. 7, the same reference signs as those of the first embodiment indicate components equal or equivalent to those of the first embodiment.

The method for manufacturing a resin gear with a core metal according to the second embodiment of the present invention is the same as the method for manufacturing a resin gear with a core metal according to the first embodiment in including a primary molding step for forming an inner member 3A by injection molding in a first cavity molding die with a sleeve 2 as an insert and a secondary molding step of putting the primary molded article in a second cavity molding die and forming an outer member 3B by injection molding.

In the resin gear with a core metal 1, one gate mark (see a gate position G2) generated at the secondary molding step is visually recognized on the side surface.
(Gate Arrangements and Weld Positions)

The molten resin is injected from the gate position G1 illustrated in the plane view of FIG. 7 into the first cavity molding die at the primary molding step. Accordingly, a position different circumferentially in phase by 180° from the gate position G1 (opposite of the gate position G1 relative to the sleeve 2 as a core metal and the central core of the inner member 3A) constitutes a weld position (weld line) W1.

The gate position G2 at the secondary molding step is circumferentially intermediate between the gate position G1 and the weld position W1 of the primary molded article.

Alternatively, the gate position G2 at the secondary molding step may be nearly circumferentially intermediate between the gate position G1 and the weld position W1 of the primary molded article.

By the gate arrangement at the secondary molding step (see the gate position G2), a weld position (weld line) W2 at the secondary molding step is circumferentially intermediate between the weld position W1 and the gate position G1.

In the foregoing description, the number of the gates is three in the first embodiment and the number of the gate is one in the second embodiment. In the present invention, however, the number of the gates at the primary molding step and the number of the gates at the secondary molding step are two or four or more, as far as they are the same.

According to the method for manufacturing the resin gear with a core metal 1 as described above, the gates of the molding dies for use at the primary molding step and the secondary molding step are pin gates, tunnel gates, or side gates, which decreases wasted material to reduce material costs as compared to the case where the gates are film gates, disc gates, or the like.

In addition, when the gates are pin gates or tunnel gates, the gates are automatically cut at the opening of the molding die. This eliminates the need to cut the gates after the removal of the molded article as compared to the case where the gates are film gates, disc gates, or the like.

Further, the gates position(s) at the secondary molding step is circumferentially intermediate or nearly circumferentially intermediate between the gate position(s) and the weld position(s) adjacent to the gate position(s) in the primary molded article formed at the primary molding step, or the gate position(s) at the secondary molding step is circumferentially intermediate or nearly circumferentially intermediate between the gate position(s) and the weld position(s) in the primary molded article. Accordingly, the weld(s) in the secondary molded article is generated at the position(s) circumferentially intermediate or nearly circumferentially intermediate between the gate(s) and the weld(s) in the primary molded article.

Therefore, in the resin gear with a core metal 1 manufactured through the primary molding step and the secondary molding step, the radial weld line(s) formed at the primary molding step and the radial weld line(s) formed at the secondary molding step do not overlap or are not positioned close to each other.

This makes it possible to suppress reduction in the strength of the resin gear with a core metal 1 as a molded article.

Further, when the annular inner member 3A and the annular outer member 3B are made of fiber-reinforced resins, in the fiber-reinforced resin tooth part 3 (the annular inner member 3A and the annular outer member 3B) in which the rate of decline in the strength of the weld line(s) would become larger with increase in charging amount of fiber-reinforced materials, the radial weld line(s) formed at the primary molding step and the radial weld line(s) formed at the secondary molding step do not overlap or are not positioned close to each other. This enhances the effect of suppressing reduction in the strength of the resin gear with a core metal 1 as a molded article.

| Reference Signs List | |
|---|---|
| 1 | Resin gear with a core metal |
| 2 | Metallic sleeve |
| 3 | Annular tooth part |
| 3A | Annular inner member |
| 3B | Annular outer member |
| 4 | Tooth |
| 5 | Tooth-shaped projection |
| 6 | Movable molding die |
| 7A | Fixed molding die for primary molding |
| 7B | Fixed molding die for secondary molding |
| 8 | Slide core |
| A | Primary molded article |
| G1, G11, G12, and G13 | Gate position at the primary molding step |
| G2, G21, G22, and G23 | Gate position at the secondary molding step |
| W1, W11, W12, and W13 | Weld position (weld line) at the primary molding step |
| W2, W21, W22, and W23 | Weld position (weld line) at the secondary molding step |

The invention claimed is:

1. A method for manufacturing a resin gear with a core metal composed of a metallic sleeve having opposing surfaces extending radially to a circumferential outer periphery of the sleeve and of a synthetic resin annular tooth part covering the outer periphery of the metallic sleeve, the method comprising:
   a primary molding step of forming an annular inner member by injection molding a first molten resin in a first cavity molding die with the metallic sleeve as an insert, thereby forming a primary molded article in which the first resin contacts each of the opposing surfaces and outer periphery of the metallic sleeve; and
   a secondary molding step of putting the primary molded article into a second cavity molding die and forming an annular outer member by injection molding a second molten resin that is a different material than the first molten resin, wherein:

the resin gear with the core metal is configured as a worm wheel of a worm gear;

the first cavity molding die and the second cavity molding die each have gates for injecting the respective first and second molten resins, the gates of each of the first and second cavity molding dies being pin gates, tunnel gates, or side gates;

the number of the gates of the first cavity molding die and the number of the gates of the second cavity molding die are plural and identical to one another and the gates of each of the first and second cavity molding dies are arranged circumferentially about the first cavity molding die and about the second cavity molding die, respectively;

the primary molded article has opposing surfaces extending radially to an outer circumference defining an outer peripheral surface of the primary molded article to have tooth-shaped projections configured to engage with the annular outer member, has gate marks corresponding to the position of the gates of the first cavity molding die during the primary molding step, and has radially extending weld lines circumferentially intermediate between adjacent ones of the gate marks of the primary molded article; and in the secondary molding step, the second resin is charged between the tooth-shaped projections and into contact with each of the weld lines and opposing and outer peripheral surfaces of the primary molded article, and the positions of the gates of the second cavity molding die are radially outward from the gate marks of the primary molded article and circumferentially intermediate or nearly circumferentially intermediate between the gate marks and the respective weld lines adjacent to the gate marks of the primary molded article.

2. The method for manufacturing a resin gear with a core metal according to claim 1, wherein the first molten resin and the second molten resin are fiber-reinforced resins.

3. The method for manufacturing a resin gear with a core metal according to claim 1, wherein the primary and secondary molding steps are performed using a common movable molding die to which the metallic sleeve is affixed, with the primary molding step further performed by defining a primary molding cavity by the common molding die, a first fixed molding die, and a slide core, and with the secondary molding step further performed by defining a secondary molding cavity by the common molding die and a second fixed molding die.

4. The method for manufacturing a resin gear with a core metal according to claim 1, wherein the primary and secondary molding steps are performed using a common movable molding die to which the metallic sleeve is affixed, the common die having a planar surface from which a first planar elevation extends, with a second planar elevation extending from the first planar elevation, and wherein said affixing of the metallic sleeve is about the second planar elevation, the primary molding step being performed such that the first resin contacts both the planar surface and first planar elevation, and the secondary molding step being performed such that the second resin contacts the planar surface.

5. The method for manufacturing a resin gear with a core metal according to claim 1, wherein an injection point for each of the gates of the second cavity molding die lie at a base of the tooth-shaped projections of the primary molded article.

6. The method for manufacturing a resin gear with a core metal according to claim 1, wherein a gate mark of the primary molded article, a gate mark of the annular outer member, a weld line of the primary molded article, and a weld line of the annular outer member are arranged in sequence circumferentially about the resin gear.

7. The method for manufacturing a resin gear with a core metal according to claim 1, wherein teeth of the synthetic resin annular tooth part covering the outer periphery of the metallic sleeve are teeth that are formed on the annular outer member and configured to engage with the worm wheel.

8. The method for manufacturing a resin gear with a core metal according to claim 1, wherein teeth of the synthetic resin annular tooth part are formed mechanically after completion of the secondary molding step.

9. The method for manufacturing a resin gear with a core metal according to claim 1, wherein teeth of the synthetic resin annular tooth part are formed as part of the secondary molding step.

* * * * *